United States Patent [19]
Habegger

[11] 3,844,235
[45] Oct. 29, 1974

[54] END TURN BINDING DEVICE AND METHOD

[75] Inventor: Richard J. Habegger, Grabill, Ind.

[73] Assignee: General Electric Company, Fort Wayne, Ind.

[22] Filed: Feb. 28, 1973

[21] Appl. No.: 336,727

[52] U.S. Cl.............. 112/121.2, 29/205 R, 29/596, 66/1 R
[51] Int. Cl........................................... D05b 23/00
[58] Field of Search...... 29/596, 606, 205 R, 205 D; 112/2, 121.2; 66/1 R; 100/2, 13, 14, 15; 310/260, 270

[56] References Cited
UNITED STATES PATENTS

| | | | |
|---|---|---|---|
| 2,580,871 | 1/1952 | Wirtz | 66/1 R |
| 2,883,949 | 4/1959 | Ammann | 112/121.2 |
| 3,050,019 | 8/1962 | Muskulus | 112/121.2 |
| 3,659,337 | 5/1972 | Gawthorp et al. | 29/606 |
| 3,685,470 | 8/1972 | Frederick | 112/121.2 X |

Primary Examiner—C. W. Lanham
Assistant Examiner—Carl E. Hall

[57] ABSTRACT

Apparatus and method for tying cord about end turn portions of coils projecting beyond a side surface of a magnetic core carrying side turn portions of the coils where the end turns may be nonradially aligned or otherwise irregularly oriented. The core which may be a dynamoelectric machine stator core having an axially extending bore and which may have coil accepting slots communicating with the bore, not all of which extend radially therefrom, is supported by a holder which may be selectively rotated to move the core through an angular path about its axis to sequentially present different end turn positions to a tying unit. The holder in turn is displaceably supported in engagement with a selectively rotatable cam the rotation of which moves the core relative to the tying unit to better align the tying unit with specific end turn positions.

18 Claims, 16 Drawing Figures

END TURN BINDING DEVICE AND METHOD

BACKGROUND OF THE INVENTION

The present invention relates to apparatus and method for tying or lacing coils in electromagnetic devices and more particularly to apparatus and a method for controlling the relative positions of a dynamoelectric machine core and certain tying components during the binding of coil end turns projecting beyond the side faces of the core with appropriate cord or the like where the magnetic core may have some irregularly oriented coil accepting slots.

In the manufacture of certain electromagnetic devices such as dynamoelectric machine stators it is desirable to bind the coil end turn portions adjacent each side face or surface of the laminated magnetic core carrying the coils. In tying the coil end turn portions one of the tying components, usually an elongated member such as a lacing needle having a hook near the free end thereof is reciprocated in its direction of elongation with rectilinear motion between adjacent coil sides next to the associated side surface of the outermost lamination and co-operates with another member which swings over the end turns during a 360° indexed cycle of the stator all as more fully disclosed in U.S. Pat. No. 3,659,337 to Gawthrop and Mason issued May 2, 1972 and assigned to the assignee of the present invention.

In the design of the dynamoelectric machine stators it is sometimes desirable to form the stator core slots in other than a radial pattern and when this is done lacing of the end turns employing a machine built in accordance with the teachings of the aforementioned patent may create problems. In lacing machines of the type disclosed in the aforementioned patent a lacing needle reciprocates along a line radial to the stator in close proximity to the outermost lamination of one side surface. This line of course lies evenly between the coil portions emanating from adjacent radially disposed stator slots. Machines like that disclosed in the aforementioned patent periodically index the stator about its axis to present new end turn portions to the tying unit but each such end turn portion is laced by moving a lacing needle along a path generally radial to the stator. The portion of the coils emanating from adjacent stator slots which are not radially disposed provide a lacing needle path therebetween which is not radially disposed and moving the lacing needle along a radial path does not of course utilize all of the available space. Minor variations from radial disposition may not create problems; however, as the non-radial disposition of the slots becomes more substantial a situation may result where the lacing needle strikes either the outer extremity of one coil portion or the inner extremity of an adjacent coil portion thus causing substantial damage to the stator windings, lacing machine or both.

It is accordingly a primary object of the present invention to provide apparatus and method for tying coils in electromagnetic devices where indexing the device through an angular path of travel may not adequately align the device with a tying unit.

Another object of the present invention is to sequentially locate stator teeth relative to a lacing needle of an end turn lacing machine.

A further object of the present invention is to sequentially position a work piece for a repetitive operation on different portions thereof where simple indexing may not suffice to properly align the work piece.

Yet another object of the present invention is to provide improved apparatus and method for controlling the relative positions of a dynamoelectric machine core and certain tying components during binding of coil end turn portions of coils carried by the core.

A still further object of the present invention is to provide improved apparatus and methods for binding the end turns of coils disposed in a dynamoelectric machine stator.

Still another object of the present invention is to provide improved apparatus and methods for positioning a magnetic core relative to an apparatus.

SUMARY OF THE INVENTION

The foregoing as well as numerous other object features and advantages of the present invention are achieved by providing a device for simultaneously tying cord about opposed end turn portions of dynamoelectric machine stator coils having a pair of lacing needles reciprocably movable along their axes of elongation and substantially parallel to one another thereby defining a lacing plane with each needle moving in that plane and passing between a stator tooth and an end turn portion to place cord about that portion in a manner substantially like that taught in the aforementioned U.S. Pat. No. 3,659,337 and by providing in two illustrative embodiments a system for indexing the stator relative to the lacing plane and for compensating for non-radial stator slot configuration. In such embodiments such system comprises means for rotationally displacing the stator about the axis of its bore to sequentially place different stator teeth in the lacing plane and means for selectively moving the stator bore axis between a location in the lacing plane for lacing along radially disposed stator teeth and a location removed from but substantially parallel to the lacing plane for lacing along non-radially disposed stator teeth.

In one embodiment a selectively actuable power take-off means including a clutch simultaneously rotates the stator about its axis by way of a gear train and rotates that stator about another axis by rotating a cam slot. One of the gears in the gear train has its axis along this second axis and thus the gears are always engaged in spite of movement of the stator axis due to rises and falls in the cam. In a second embodiment a first pair of conjugate cams co-operate with a peripherally disposed set of cam followers to periodically index the stator about its axis and a second set of conjugate cams engage cam followers on a pivotable arm supporting the stator and peripherally disposed set of indexing cam followers to displace the stator axis relative to the lacing machine. In this last embodiment, while the cams are running constantly when the lacing machine is running, the cams are so configured as to index the stator only when it is free of elements in the tying unit of the lacing machine.

In either embodiment the tying of cord about end turn portions is accomplished by reciprocably moving at least one lacing needle along its axis of elongation and between a stator tooth and an end turn portion to, in co-operation with at least one other element, place cord about that end turn portion whereupon the stator is rotationally displaced about its axis and displaced about another axis which is substantially parallel to and removed from the stator axis whereupon the lacing needle is again reciprocably moved along its axis of elongation and between a different stator tooth and end turn portion to place cord about that different portion of the end turns.

BRIEF DESCRIPTION OF THE DRAWINGS

The subject matter of the present invention is particularly pointed out and distinctly claimed in the concluding portion of the specification however the invention itself both as to organization and method of operation together with further advantages thereof may best be understood by reference to the following description taken in conjunction with the accompanying drawings wherein:

DESCRIPTION OF THE PREFERRED EMBODIMENT

Figure 1:
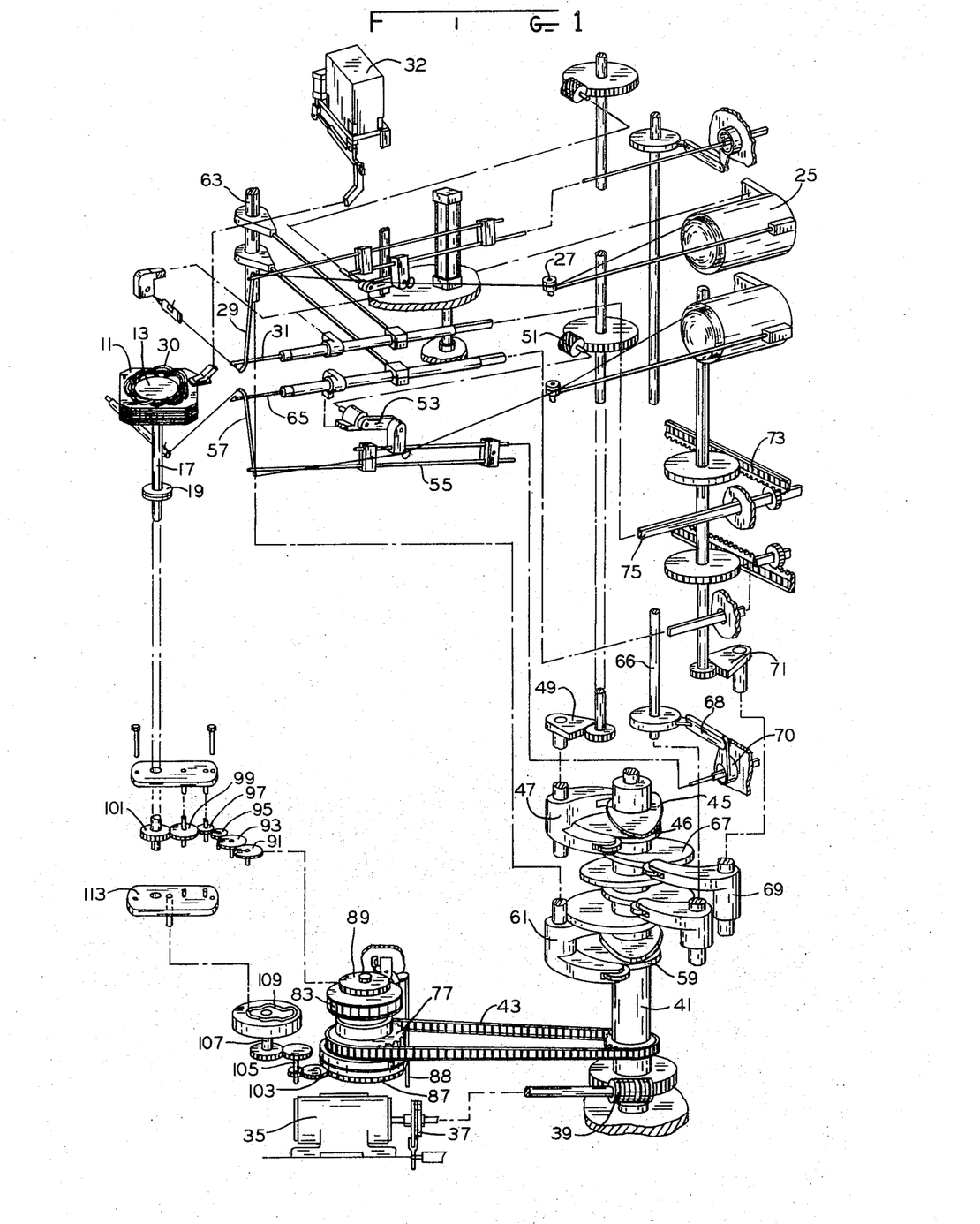
FIG. 1 is a schematic representation of a coil end turn binding machine embodying the present invention in one form.
Figure 2:
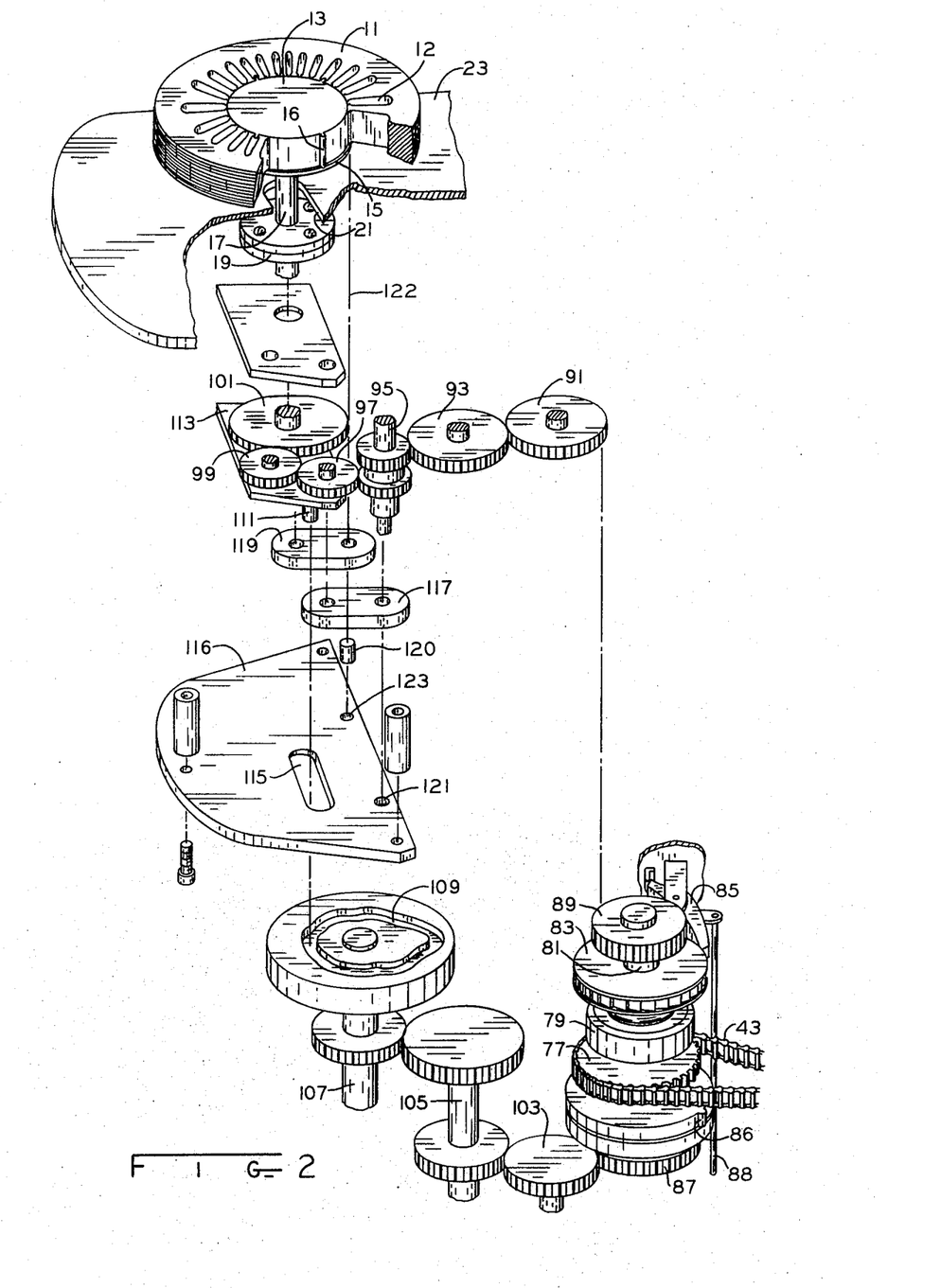
FIG. 2 is a schematic representation of the stator positioning apparatus of FIG. 1 shown in greater detail.

Turning now to a more detailed consideration of the drawings and more especially the somewhat schematic representation of FIG. 1 which illustrates in exploded form the general operation of an end turn lacing device embodying the principles of the present invention in conjunction with FIG. 2 a magnetic device such as a dynamoelectric machine stator core 11 is held in a desired position by a mandrel 13 having a lower support rim 15 and one or more keys 16 which fit accurately between stator teeth to align the core 11 relative to the mandrel 13. The means for holding the stator in a desired location further includes the downwardly extending axle 17 which by way of coupler 19 fixedly attaches the mandrel to a gear 101. The axle 17 passes through an elongated hole 21 in the top surface portion 23 of the housing of the lacing machine.

Cord or a similar binding material from a cord supply 25 is passed through a tensioning device 27 and a tubular core feeding member 29 which by a combined axial and rotary motion presents the cord alternately to the interior and exterior of portions of the end turns 30 of coils disposed in the slots 12 of the stator core 11. A lacing needle 31 having a hook 33 near the free end thereof executes a reciprocating motion along its axis of elongation and a rotary motion thereabout and repetitively passes between end turn portions and the upper lamination of stator as viewed in FIG. 1 to cooperate with the cord feeding member 29 in the lacing operation to form a chain stitch about the coil end turns.

A source of energy such as the electric motor 35 is coupled by way of the clutch-brake assembly 37 and worm gear arrangement 39 to cause the shaft 41 to continously revolve about its axis during the lacing operation. The shaft 41 supports a plurality of pairs of complimentary cams and for example the pair 45 actuate, by way of the follower 47 a spur gear segment 49 which by way of another pair of gears on a common shaft and the helical gear 51 imparts an oscillatory motion to the arm or crank lever 53 to supply a longitudinally swinging motion to the tubular cord feeding member 57. FIG. 1 of course illustrates a machine which performs a simultaneous lacing operation on corresponding end turn portions above and below the stator as viewed. Thus the motion of the cord feed member 57 is the mirror image of the motion of the cord feeding member 29 and a similarly lacing needle 65 executes a mirror image of the motion executed by lacing needle 31. With this symmetry in mind, cam 59 by way of follower 61 causes the shaft 63 to oscillate about its axis imparting a simultaneous movement to the lacing needles 31 and 65 so that these needles may reciprocate in their general direction of elongation between extended positions where they pass between a stator tooth and an end turn portion and retracted positions beyond the radial extent of the stator. During this back and forth motion of the two lacing needles 31 and 65, the needles additionally receive an oscillatory motion about their axis of elongation from the cam 67 by way of the follower 69 and spur gear segment 71 which causes racks such as 73 to move back and forth twisting the lacing needles about their axes. The tubular cord feeding members 29 and 57 must of course execute an arc over the end turn portions to present the cord at opposite sides of that end turn and to the hooks such as 33 of the lacing needles. In addition to the motion imparted by movement of the arm 53, these cord feed members are rotated by the rotary oscillations of shaft 66 by way of connecting link 68 to an end bearing structure 70. The shaft 66 of course receives its rotary oscillating motion from a cam follower and yet another complimentary pair of cams supported on the shaft 41. The upper tying unit may be made movable relative to the lower tying unit in response to stator height as sensed by unit 32 as more clearly disclosed in the aforementioned patent.

The functions derived from motion of the shaft 41 as thus far discussed as well as other general features of operation of a lacing machine are all more clearly disclosed in the aforementioned U.S. Pat. No. 3,659,337 the entire disclosure of which is specifically incorporated herein by reference. A sprocket 77 by way of chain 43 is driven by the shaft 41 and this sprocket as well as the disc having the protrusion 86 are revolving so long as the shaft 41 revolves however these two elements are coupled to the shaft 81 only by the slip clutch arrangement 79 and thus rotation of the sprocket 77 only applies a constant torque to shaft 81 to urge the shaft 81 to revolve. Rotation of the shaft 81 is generally prevented by the engagement of the pawl 85 in a notch of the ratchet wheel 83. For each revolution of the shaft 41 one complete lacing cycle occurs and a corresponding revolution of the disc protrusion 86 also occurs. In one preferred embodiment, two opposed protrusions were provided and one revolution of the disc corresponded to two lacing cycles. If the protuberance 86 is properly positioned relative to the angular position of the shaft 41, this protrusion 86 will trip a lever mechanism 88 to momentarilly disengage the pawl 85 and allow the disc 83 along with shaft 81 and gears 87 and 89 to experience an angular displacement of one or more teeth on the ratchet wheel 83. This indexing of the shaft 81 should of course occur when the lacing needles and cord feeding members are in their retracted positions so as to not interfere with the indexing of the stator 11.

The periodic angular motion of the gear 89 by way of gears 91, 93, the compound gear on the shaft 95, gear 97, idler gear 99 and gear 101 impart a similar periodic angular motion to the stator 11. By proper choice of the angular separation of the teeth on ratchet wheel 83 and gear ratios of gears 91 and 101 (since the intervening gears function as idlers) this periodic angular motion may be made to occur in increments equal to the angular separation between individual stator teeth or integral numbers of stator teeth as desired.

Each time pawl 85 allows the ratchet wheel to move, the same angular displacement is experienced by both gears 87 and 89 since they are both rigidly affixed to the shaft 81. This angular motion is transmitted by way of gear 103, the gears attached to shaft 105, and the gear attached to shaft 107 so as to angularly move a face groove cam 109. This face groove cam or cam track 109 is adapted to accept a follower 111 affixed to a plate 113 which supports some of the gears in the previously discussed gear train for rotating the stator about its axis. The follower 111 passes through an elongated slot 115 in an illustrative portion of the machine frame 116. A pair of arms or linkages 117 and 119 are pivotably attached at one end to the plate 113 respectively along the axes of gear 97 and gear 101 and are pivotably attached to a portion of the frame 116 at their other ends respectively along the axis of shaft 95 and by a stud 120 to holes 121 and 123 respectively. This allows a parallelogram type of motion by the plate 113 relative to the frame 116. Since the axis of shaft 95 corresponds to the pivot hole 121 the gears on shaft 95 mesh with their respective adjacent gears 93 and 97 regardless of oscillation of the arm 117 about the axis of shaft 95 and thus rotation of, for example, gear 89 will cause the corresponding rotation of the gear 101 and of the stator regardless of the particular positioning of the plate 113. Thus the stator may be rotated about its axis by revolving the gear train beginning with gear 89 and at the same time that axis may be displaced by rotating for example the linkage 119 about its axis corresponding to the stud 120.

Figure 3A:
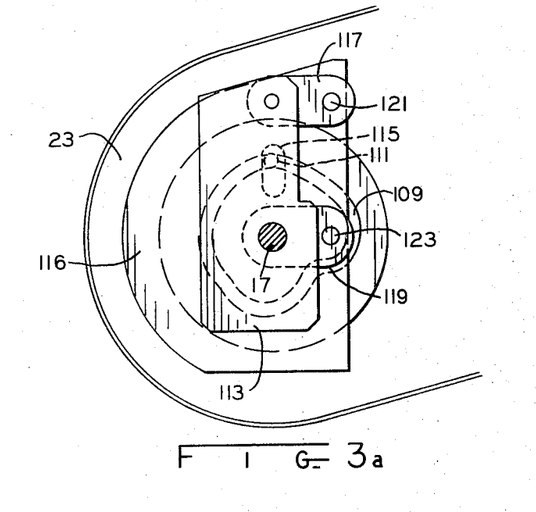
FIG. 3a illustrates a top view of the relative position of some of the elements of FIG. 2 for lacing between radially disposed stator slots.
Figure 4A:
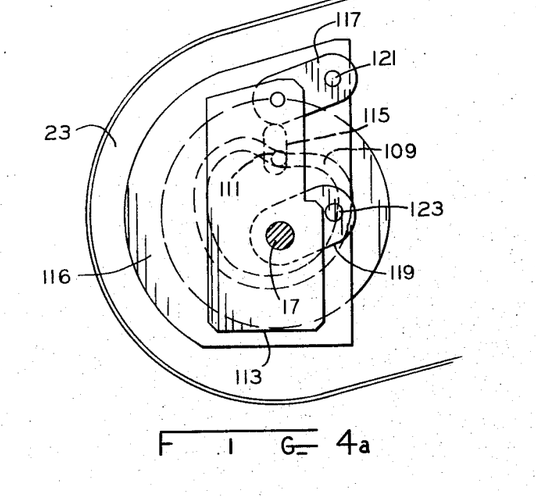
FIG. 4a corresponds to FIG. 3a but illustrates positioning for nonradial slot lacing.
Figure 5:
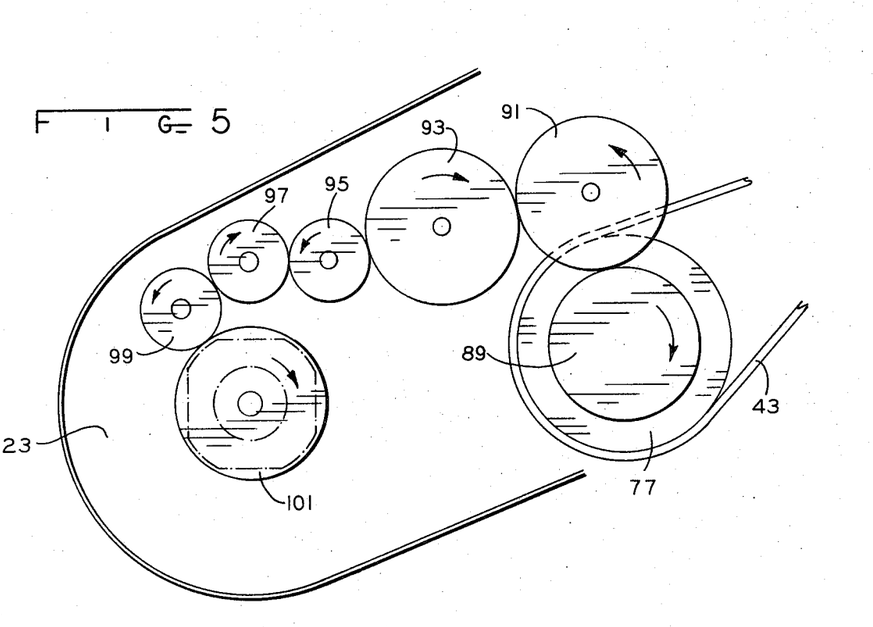
FIG. 5 illustrates the action of the gear train of FIG. 2 for pure rotation of a stator about its bore axis.

The structure as viewed from the top in FIGS. 3a, 4a, and 5 is a mirror image of the similar structure schematically depicted in FIGS. 1 and 2. This relative positioning was reversed from the preferred form to better illustrate the interaction of the several gears in the gear train. In an actual preferred embodiment the pitch radii of gears 95 and 97 were selected as equal and to be one half the pitch radius of the gear 101. Gear 99 of course merely functions as an idler gear and may be of any size. The pitch radius of gear 101 was further selected to be the same as the radii of the pivotable arms 117 and 119.

Figure 3B:
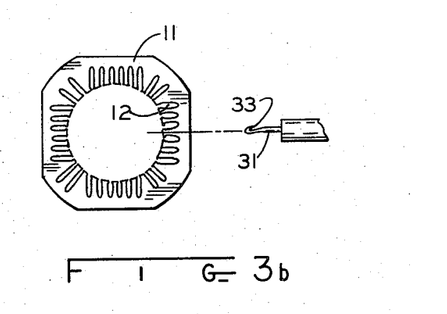
FIG. 3b illustrates the corresponding lacing between the radially disposed stator slots.

As illustrated in FIG. 2, movement of the cam track 109 causes the stator 11 to be revolved about a point on the periphery of its bore corresponding to the axis 122 of stud 120 however it should be noted that this choice is not necessary and is merely convenient for the purposes of explanation. Movement of the gear 89 causes the stator to be rotated about its bore axis and again this is a convenient choice for explanation purposes. To take a specific example the stators illustrated in FIGS. 3b and 4b have 32 slots and 32 corresponding stator teeth not all of which are radially disposed and may for example illustrate a stator for a four pole machine. Under these assumed circumstances and further assuming that those portions of the stator teeth facing the bore are evenly distributed thereabout each notch of ratchet wheel 81 should cause gear 101 to experience one thirtysecond of a revolution. Of course if the stator teeth faces are not uniformly distributed about the bore the particular notches in ratchet wheel 81 might be made correspondingly non-uniform, certain notches may be masked so that the ratchet wheel indexes more than one notch at certain times or the stator 11 might otherwise be made to undergo non-uniform increments. As illustrated in FIG. 3b the lacing needle 31 is aligned with a radially disposed stator tooth for lacing the end turns emanating from adjacent slots to that radially disposed tooth.

Figure 4B:
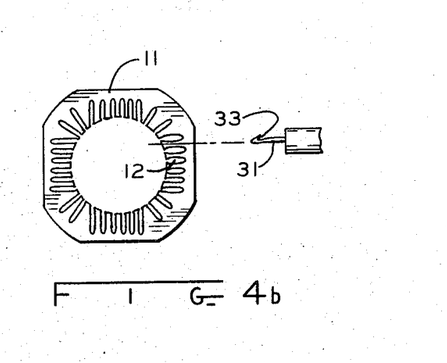
FIG. 4b illustrates the repositioning of the stator of FIG. 3b for such nonradial slot lacing.

The situation illustrated in FIG. 4b however shows that to properly align the lacing needle with a nonradially disposed stator tooth requires more than the purely rotational indexing of the stator as taught in the aforementioned U.S. Pat. No. 3,659,377 Pat. In comparing FIGS. 3b and 4b it would appear that the stator has been merely laterally shifted to properly align the needle and stator tooth however this apparent shifting is actually accomplished by the simultaneous occurrence of two rotations of the stator one about its bore axis by the gear train illustrated in FIG. 5 and the other about the axis 122 of the pin 120 due to the rotation of the cam track 109 moving the plate 113 by the connecting follower 111. Such a rotation about the stator bore axis and displacement of that axis relative to the lacing needle may be achieved in other ways for example by the structure illustrated in FIG. 6.

Figure 6:
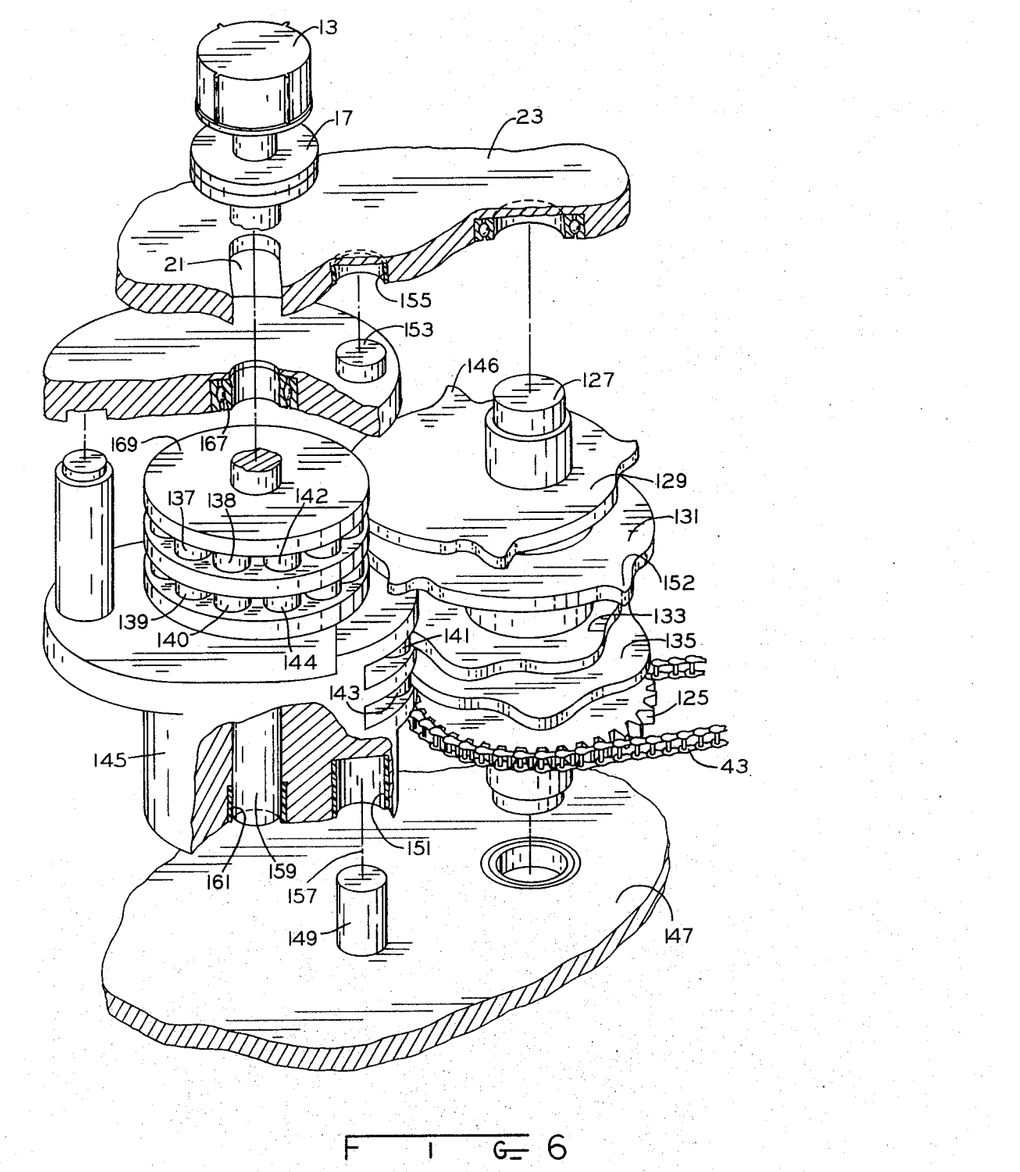
FIG. 6 is a perspective view of an alternate embodiment to the apparatus of FIG. 2.

In FIG. 6 the mandrel 13 coupling 17 and a portion of the machine housing 23 having an arcuate slot 21 correspond to the similar structures in FIG. 1. Also corresponding to FIG. 1 is the chain 43 which is driven at a constant velocity by, for example, the shaft 41 of FIG. 1. The apparatus of FIG. 6 may in essence be substituted for that apparatus illustrated in FIG. 2 to take the place thereof in the lacing machine of FIG. 1. In FIG. 6 the chain 43 drives a sprocket 125 at a constant velocity during lacing but unlike the corresponding sprocket of FIG. 2 this sprocket 125 is rigidly attached to a shaft 127 to which there are rigidly attached a plurality of cams 129, 131, 133, and 135. Thus these cams are in motion at all times during a lacing operation, and the synchronism of the indexing and the displacing of the stator with the lacing operation is determined by appropriate dwell times associated with these cams. In one preferred embodiment about 80percent of the revolution time was dwell for lacing with the remaining 20percent of the time available for indexing and repositioning.

The upper pair of cams 129 and 131 constitute a conjugate or complimentary pair of cams and engage respectively the pluralities of follower rollers such as 137 and 139 and function as a so-called unidirectional oscillating cam to periodically index the stator about its axis. The cam pair 133 and 135 function as displacement conjugate cams by engaging respectively the follower rollers such as 141 and 143. Both sets of followers are supported on an arm 145 which is rotatably supported on a portion of the lacing machine frame 147 by stud 149, sleeve bearing 151, stud 153 and sleeve bearing 155. Thus the arm is free to rotate about the axis 157 as dictated by the displacement cams 133 and 135. An axle is rotatably supported on the arm by sleeve bearing 161 and a roller bearing 163 so that movement of the follower supporting disc 169 fixed to shaft 159 will cause the mandrel 13 and thus a stator core supported thereon to rotate about its bore axis. Thus any motion of the stator which may be achieved by the structure of FIG. 2 is also achievable employing the structure of FIG. 6 with the axis of axle 159 being analogous to the axis of the gear 101 and the axis of the stud 149 being parallel thereto and removed therefrom and analogous to the axis 122 of FIG. 2.

Figure 7A:
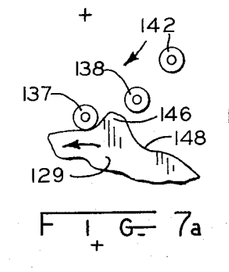
FIGS. 7a through 7d illustrate the interaction between one indexing cam and its series of follower rollers.
Figure 7B:
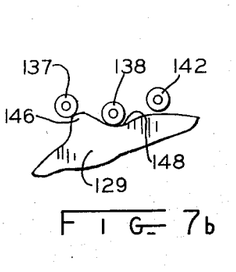
Figures 7C, 7D:
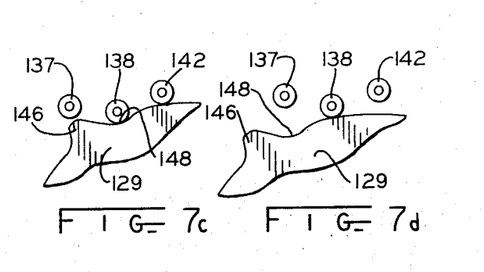
Figure 8A:
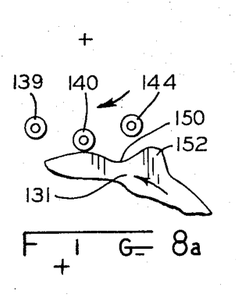
FIGS. 8a through 8d illustrate the corresponding behavior of a conjugate indexing cam and its corresponding follower rollers.
Figure 8B:
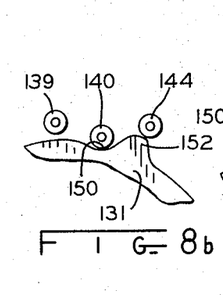
Figures 8C, 8D:
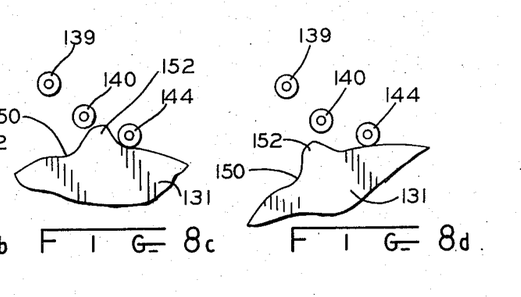

The interaction of the cams 129 and 131 with their respective followers is perhaps best seen by referring to the sequential depictions of FIGS. 7 and 8. FIG. 7 corresponds to varying relative positions of the cam 129 and its followers while FIG. 8 illustrates the correspondingly occuring interaction of cam 131 and its followers. With an assumed counterclockwise direction of cam rotation, FIGS. 7a and 8a illustrate the situation which as prevailed during the most recently completed lacing cycle. At this time, when the lacing needles are withdrawn from the stator, roller 137 is engaged by a protrusion 146 which causes the follower wheel 169 to move clockwise as viewed. As the wheel revolves in its clockwise direction the next roller 138 is allowed to move to the left beyond center by a depression 148 and as rotation of the cam 129 continues this roller 138 assumes the engaged position previously occupied by roller 137 for the next lacing cycle. In FIG. 8a the roller 140 has been in engagement with the cam 131 during the previous lacing cycle and as the protrusion 146 forces the wheel 169 to revolve this roller 140 is allowed to pass leftwardly through center and additionally is forced to rotate with the wheel 169 in a clockwise direction by a protrusion 152. As the cam 131 continues to rotate, roller 144 assumes the position previously occupied by roller 140 for the next lacing cycle. As viewed in FIGS. 7d and 8d roller 138 is somewhat left of a center or neutral position while roller 144 is somewhat to the right of such a neutral position thus maintaining the conjugate nature of the cams and their respective followers. A similar left of center and right of center arrangement is maintained between the cams 133 and 135 and their respective follower rollers so that the arm 145 is always maintained in a positive location by the cams and no spring loading of that arm is required.

To briefly summarize, the present invention provides apparatus and methods for increasing the versatility of lacing equipment such as illustrated in U.S. Pat. No. 3,659,337 so that end turns of coils in nonradially disposed core slots such as found for example in graded slot stators may be bound and, in conjunction with other equipment for performing other operations on such exemplary graded slot stators, substantially reduces the cost of manufacture of such electromagnetic devices. The exemplary equipment of the present invention is of course completely compatible with equipment for performing operations on radially disposed core slot devices since by employing, for example, circular displacement cams which rotate about their geometric centers no displacement but only indexing about the stator core bore will occur. It should further be clear that while indexing in the uniform increments has been disclosed indexing by nonuniform increments is also contemplated by the present invention.

A rather complete discussion of cam design may be found in the book entitled "Cams" by Harold A. Rothbart published by John Wiley and Sons, in 1956. As noted in this text, to achieve high speed operation it is highly desirable to consider not only cam motion but also the first and second derivatives thereof so that extremely high accelerations may be avoided and overall machine operating speeds substantially improved.

Thus while the present invention has been described with respect to a specific embodiment numerous modifications will suggest themselves to those of ordinary skill in the art and accordingly the scope of the present invention is to be measured only by that of the appended claim.

I claim:

1. In a device for binding the end turn portions of dynamoelectric machine stator coils, an improved apparatus for indexing the stator relative to the binding device and for compensating for non-radial stator slot configuration comprising: first means for moving a stator relative to a first axis; and second means for rotating the stator about a second axis parallel to and removed from the first axis.

2. The improvement of claim 1 wherein the first axis is fixed relative to the device for binding and the second axis is displaceable relative to the first axis.

3. The improvement of claim 1 wherein the first means comprises an arm pivotably attached to the binding device along the first axis for arcuate movement relative thereto, and rotatable cam means engaging the arm to cause arcuate movement of the arm about the first axis in response to rotation of the cam means.

4. The improvement of claim 1 further comprising means for periodically simultaneously enabling the first and second means to present a new portion of the end turns for binding.

5. The improvement of claim 4 wherein the enabling means comprises power take-off means for deriving a uniform angular velocity from the binding device and for urging the first and second means to rotate the stator about their respective axes, means for preventing the first and second means from rotating, and means responsive to a predetermined angular displacement of the power take-off means for momentarily disabling the preventing means to thereby allow indexing of the stator.

6. In a device for tying cord about the end turn portions of dynamoelectric machine stator coils disposed in slots surrounding an axially extending stator core bore, an improved apparatus for indexing the stator relative to the device and for compensating for non-radial stator slot configuration comprising: means for selectively rotating a stator about its bore axis; and means for selectively displacing the stator bore axis relative to the device so as to compensate for non-radial slot configuration while cord is being tied about the end turn portions.

7. The improvement of claim 6 wherein the means for selectively displacing comprises an arm supported for movement about an arm axis which is fixed relative to the device and the means for selectively rotating comprises a stator supporting mandrel supported on the arm for rotation about an axis substantially collinear with the bore axis and which is parallel to and removed from the arm axis.

8. A method of tying cord about the end turn portions of dynamoelectric machine stator coils wherein the stator has an axis and at least some non-radially disposed core teeth comprising;

reciprocably moving at least one lacing needle along its axis of elongation and between a stator tooth and an end turn portion to place cord about that portion;

rotationally displacing the stator about its axis;

rotationally displacing the stator about another axis substantially parallel to and removed from the stator axis; and reciprocably moving the at least one lacing needle along its axis of elongation and between a different stator tooth and end turn portion to place cord about a different portion of the end turns.

9. In a device for simultaneously tying cord about opposed end turn portions of dynamoelectric machine stator coils wherein a pair of lacing needles reciprocably move along their axes of elongation and substantially parallel to one another to thereby define a lacing plane with each needle moving in that plane and passing between a stator tooth and an end turn portion to place cord about that portion, improved apparatus for indexing the stator relative to the plane and for compensating for non-radial stator slot configuration comprising;

means for rotationally displacing a stator about an index axis to sequentially place different stator teeth in the lacing plane; and means for selectively moving the index axis between a location in the lacing plane for lacing along a radially disposed stator tooth and a location removed from and substantially parallel to the lacing plane for lacing along a nonradially disposed stator tooth.

10. The improvement of claim 9 wherein the lacing needles move in unison between retracted positions beyond the radial extent of the stator and extended positions passing between a stator tooth and an end turn portion and further comprising means for synchronizing the apparatus for indexing with the lacing needle movement so that rotational displacement and selective moving can occur only when the lacing needles are in their retracted positions.

11. A method of tying cord about the end turn portions of coils disposed in a magnetic core comprising;

reciprocably moving at least one lacing needle along its axis of elongation and between a magnetic core and an end turn portion to place cord about that portion;

rotationally displacing the core about an axis;

displacing the core and the axis of rotation; and reciprocably moving the at least one lacing needle along its axis of elongation and between the magnetic core and a different end turn portion to place cord about a different portion of the end turns.

12. Apparatus for tying cord about at least one end turn portion of coils projecting beyond an associated side of a magnetic core carrying side turn portions of the coils comprising: holding means for supporting the magnetic core having the coils; tying means for binding the at least one coil end turn portion with cord; indexing means for periodically moving the at least one coil end turn portion and tying means relative to one another through an angular path about a first axis; and displacement means for periodically moving the at least one coil end turn portion and tying means relative to one another through an arcuate path distinct from said angular path, the arcuate path having a center along a second reference axis parallel to and spaced from the first axis.

13. The apparatus of claim 12 wherein the magnetic core is a dynamoelectric machine stator core having an axially extending bore, the indexing means being operable to periodically revolve the stator about its bore axis and the displacement means being operable to displace the bore axis relative to the tying means.

14. The apparatus of claim 12 wherein the indexing means and displacement means are operable simultaneously.

15. The apparatus of claim 12 wherein the displacement means comprises a pivotable arm supporting the holding means and cam means engaging the arm to cause the arm to selectively pivot about the reference axis in response to rotation of the cam means.

16. The apparatus of claim 15 wherein the magnetic core is a dynamoelectric machine stator core having an axially extending bore, the indexing means and displacement means being operable to periodically simultaneously revolve the stator about its bore axis and to selectively displace the bore axis relative to the tying means, the indexing means comprising additional cam means rotatable in unison with said cam means and a plurality of follower means distributed about the holding means, said additional cam means being in contact with a sub-plurality of the follower means and operative to engage additional ones of the follower means while disengaging other ones of the follower means to thereby cause rotation of the holding means to index the stator supported thereon.

17. The apparatus of claim 16 wherein the said cam means and the said additional cam means rotate at a constant angular velocity about a common axis.

18. The apparatus of claim 15 wherein the magnetic core is a dynamoelectric machine stator core having an axially extending bore, the indexing means and the displacement means being operable to periodically simultaneously revolve the stator about its bore axis and to selectively displace the bore axis relative to the tying means, the indexing means comprising a first gear fixedly attached to the holding means, a second gear selectively revolvable about an axis fixed relative to and removed from said reference axis, and mechanical motion transmission means interconnecting the first and second gears to cause the first gear and holding means to rotate in response to rotation of the second gear while maintaining rotation of the first gear relative to the pivotable arm independent of motion of the arm about the reference axis.

* * * * *